No. 650,005. Patented May 22, 1900.
R. T. GILLESPIE.
VENTILATED CURRYCOMB.
(Application filed Dec. 31, 1898.)
(No Model.) 3 Sheets—Sheet 2.
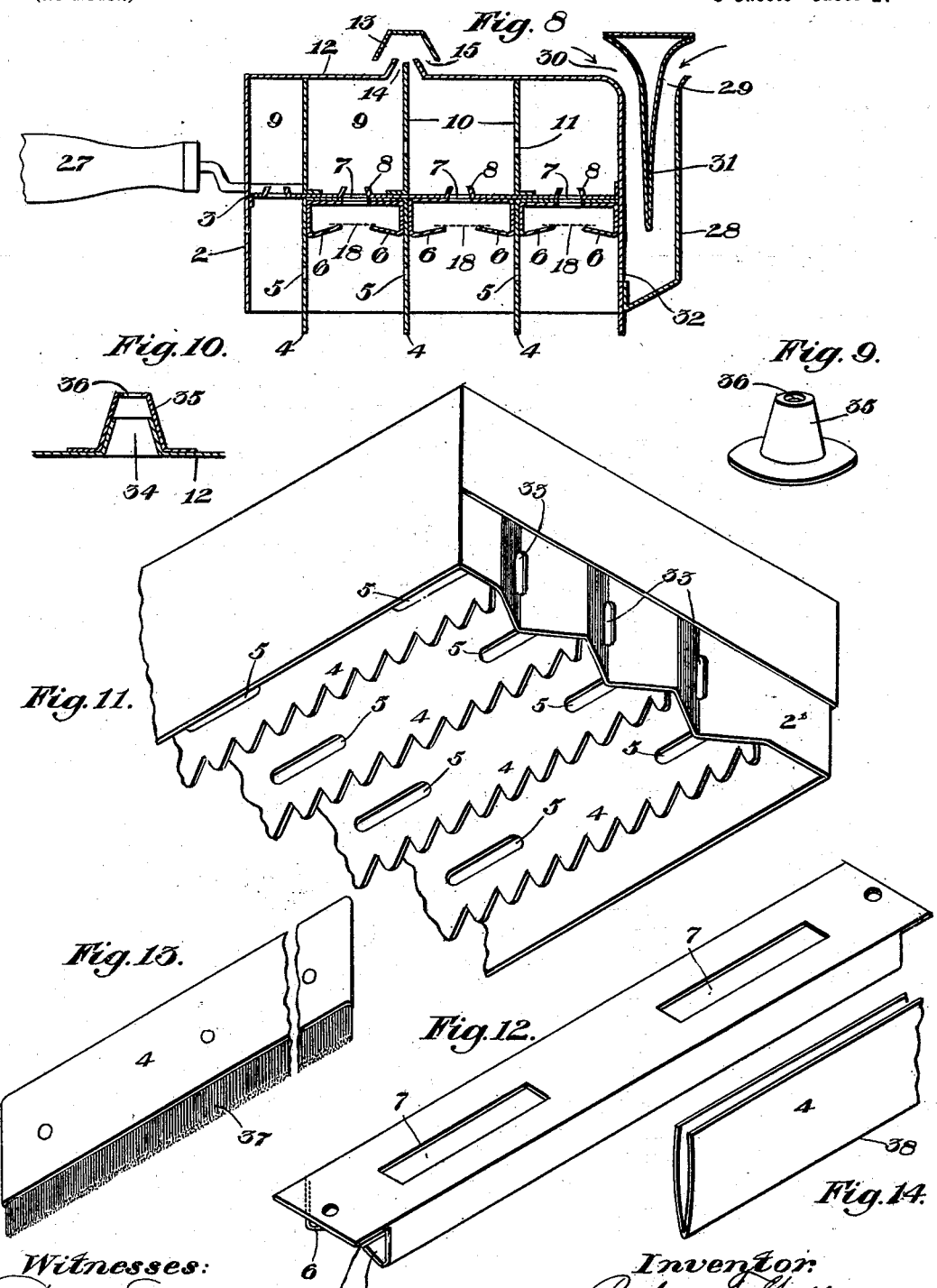

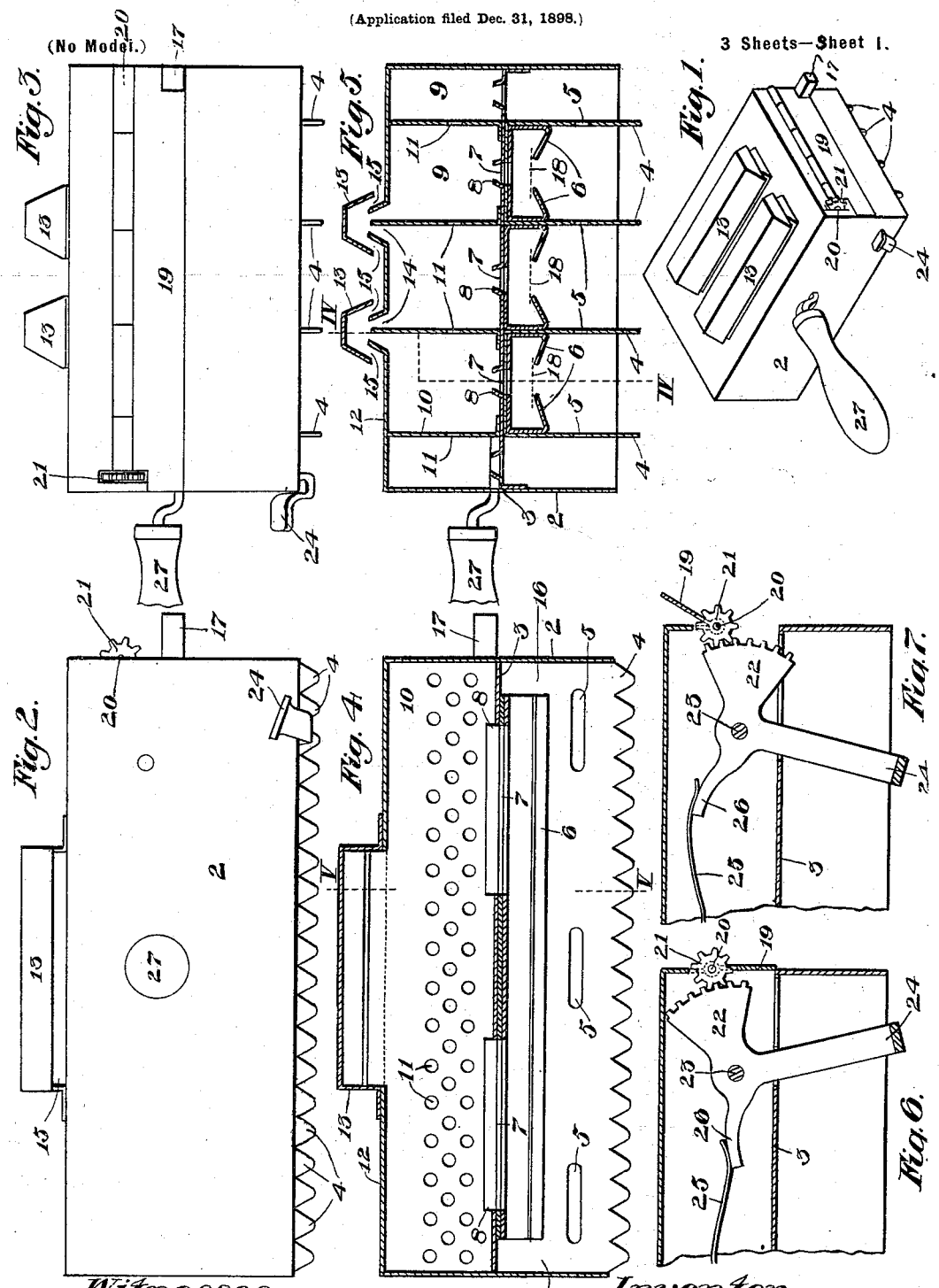

No. 650,005. Patented May 22, 1900.
R. T. GILLESPIE.
VENTILATED CURRYCOMB.
(Application filed Dec. 31, 1898.)
(No Model.) 3 Sheets—Sheet 3.
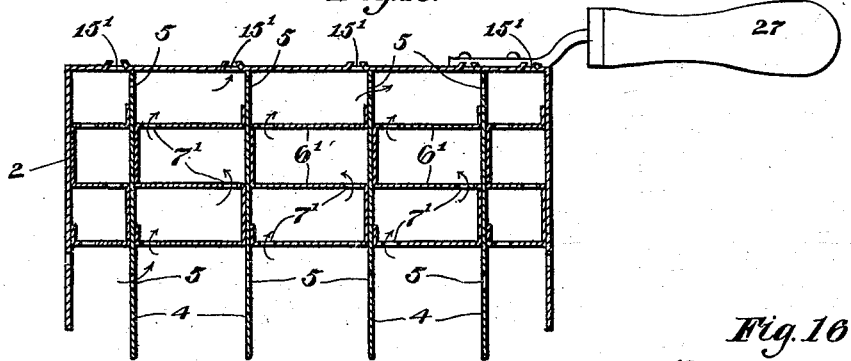
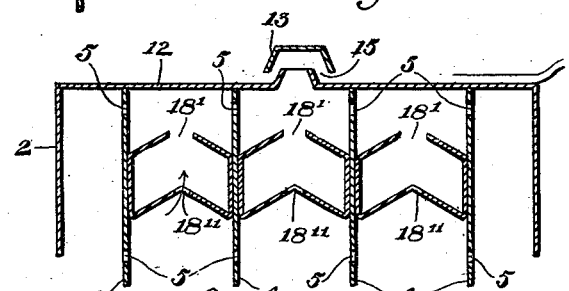
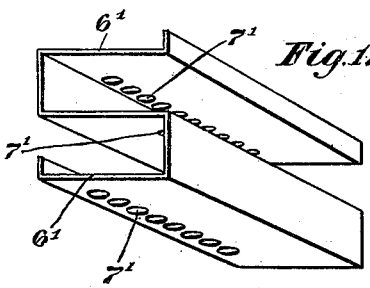
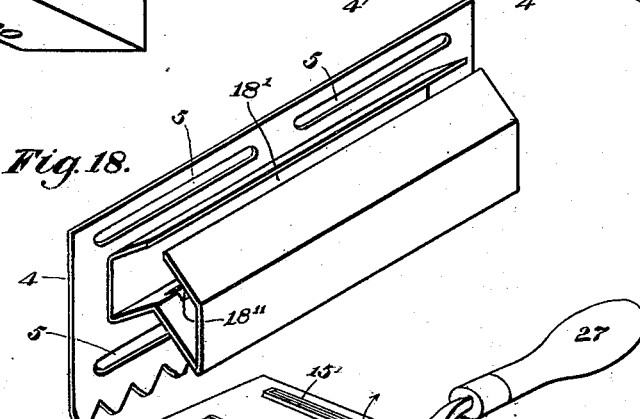
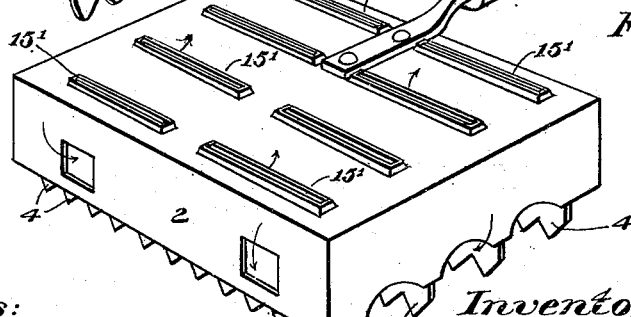
Witnesses:
Watson Large
D. J. Edwards
Inventor:
Robert T. Gillespie
by O. M. Clarke
his Attorney

UNITED STATES PATENT OFFICE.

ROBERT T. GILLESPIE, OF UNIONTOWN, PENNSYLVANIA.

VENTILATED CURRYCOMB.

SPECIFICATION forming part of Letters Patent No. 650,005, dated May 22, 1900.

Application filed December 31, 1898. Serial No. 700,801. (No model.)

*To all whom it may concern:*

Be it known that I, ROBERT T. GILLESPIE, a citizen of the United States, residing at Uniontown, in the county of Fayette and State of Pennsylvania, have invented or discovered a new and useful Improvement in Ventilated Currycombs, of which the following is a full, clear, and exact description, reference being had to the accompanying drawings, forming part of this specification, in which—

Figure 1 is a perspective view of my improved currycomb. Fig. 2 is a side elevation, on an enlarged scale, from the handle side.
Fig. 3 is an end elevation. Fig. 4 is a longitudinal section on the line IV IV of Fig. 5. Fig. 5 is a cross-section on the line V V of Fig. 4. Figs. 6 and 7 are detail sectional views of the mechanism for operating the discharging-gate. Fig. 8 is a cross-sectional view illustrating a modified construction. Fig. 9 is a perspective detail view of a modified form of ventilating-coping. Fig. 10 is a sectional view thereof. Fig. 11 is a perspective detail view of a portion of the comb from below. Fig. 12 is a detail view of one of the dust-collectors detached. Fig. 13 is a detail view of a brush which is substituted for the teeth, if desired. Fig. 14 is a similar detail view showing a rounded smooth scraping edge. Fig. 15 is a cross-sectional view through the comb, showing a construction in which a series of horizontal dust-collecting shelves is embodied in the comb, such shelves being perforated through their horizontal portions alternately and occupying, with their intervening spaces, the body portion of the comb above the blades and to the top cover, the top being provided with outlet-openings. Fig. 16 is a similar view showing a series of shelves having inclined faces and air-circulation perforations therethrough, the shelves being located between the comb-blades. Fig. 17 is a detail perspective view of one of the series of dust-shelves embodied in Fig. 15. Fig. 18 is a similar view showing one of the shelf-boxes attached to one of the comb-blades. Fig. 19 is a perspective view of the comb as constructed with either of these forms of dust-collecting shelves.

My invention consists of an improvement in currycombs and refers to the means for ventilating its interior and for collecting and discharging the accumulated dandruff, &c.

Referring to the drawings, 2 is the main body portion of the currycomb, preferably rectangular in form, having a horizontal cross-partition 3 extending from side to side and dividing the comb into upper and lower compartments.

Secured to the middle partition and projecting downwardly therefrom at regularly-spaced locations are the toothed comb-blades 4, having perforations or openings 5 through their middle portion at intervals. Projecting inwardly and upwardly from the combs are dust-collecting shelves 6, preferably made of a bent piece of sheet metal, as in Fig. 12, with the sides formed into ledges extending to within a short distance of each end and secured up against the under side of middle partition 3. Perforations or openings 7, with lateral upwardly-projecting edges 8, are made midway between the comb-sections, leading upwardly into the compartments 9 above the middle partition, such compartments being preferably divided by longitudinal partitions 10, having perforations or openings 11 therethrough.

The top of the compartment 9 is covered by a plate 12, in which is located one or more upwardly-projecting ventilating-copings 13, into which lead openings 14 from the interior and openings 15 from the exterior, through which latter openings a current of air is induced by action of the comb operating to set up a circulation of air through the various openings in the walls and partitions and serving to carry with it the dust, dandruff, &c., dislodged by the teeth of the comb. Such refuse matter will either be deposited upon the shelves 6 or will pass upwardly through openings 7 and be deposited upon the middle partition 3, the vertical partitions 10 serving to prevent the escape of the dust with the air-current while permitting air to circulate freely through the openings 11. It will be seen that the shelves 6 do not extend clear to the end walls, but that an intervening space 16 is left at each end, down through which the dust will fall upon knocking the comb to discharge the accumulation, for which purpose a projecting extension 17 is provided at one end. The space between the adjacent edges of the shelves 6 is covered by a coarse wire-netting 18 to prevent the passage of the coarser particles or the entrance of foreign substances.

At one end of the comb, closing the upper compartment, is a hinged gate 19, mounted upon a shaft 20 in suitable bearings, to one end of which shaft is secured a toothed wheel 21, into which meshes a segment 22, pivoted at 23 and provided with a downwardly and outwardly projecting finger-piece extension 24, by which the segment is operated against the pressure of a spring 25, adapted to bear upon an extended tail 26 of the segment. The action of the spring tends to close the gate and retain it in such position, while by depressing the finger-piece the gate is opened, as shown in Fig. 7, when the accumulated dust may be discharged.

A handle 27 is secured to the middle cross-partition 3 and projects out at one side, and it will be seen that the finger-piece 24 is within easy reach of such handle.

In Fig. 8 I have shown a construction employing an outer-air conductor 28, downwardly into which lead air-entrance ports 29 and 30, meeting at the bottom below a tapering partition 31 and leading into the interior of the comb through openings 32, corresponding to openings 5.

In Fig. 11 the ends of the comb-sections 4 are closed by an end plate 21', projecting inwardly between each comb and having at the apex of each projection an air-inlet opening 33, through which air may pass from the exterior.

Figs. 9 and 10 illustrate a modified form of ventilating opening, in which the upper plate 12 is provided with a punched or perforated hole 34, which is then reinforced by a covering-sheath 35, having a corresponding hole 36 in its top.

In Fig. 13 the comb-plate 4 is shown as provided with a brush 37 along its lower edge, and such a construction will give good results where it is desired to dispense with the vigorous action of a toothed comb, while in Fig. 14 the plate 4 is simply doubled upon itself, providing a rounded lower edge 38, which may be used with good results for rubbing without unduly agitating the hair.

In Figs. 15 to 19, inclusive, I have illustrated forms of construction in which the main cross partition of the comb is dispensed with, and the upper portion of the construction is simply occupied by dust-collecting shelves provided with perforating-openings, by which the air will circulate in the manner indicated by the arrows, depositing the dust, &c., on the various shelves, from which it is dislodged by knocking. In these figures the body portion 2 of the comb is substantially the same as already described. The comb-blades 4, with perforations 5, are secured to the top of the case and between the blades, and between blades and wall are transverse shelves 6' in the form shown in Fig. 15, consisting of several horizontal portions formed of one piece of metal with alternate rows of holes 7', through which the air will circulate, carrying the dust in suspension and depositing it along the corners of the shelves, the air finally emerging from openings 15' in the top.

In the form shown in Figs. 16 and 18 the ledges or shelves are sloped upwardly, with openings 18' and 18" through the upper and lower shelves, respectively, the blades being provided with openings 5, through which the air will enter, as already described. It will be understood that these shelves, of whatever form, do not extend to the end, but that free space is left through which the dust may fall when the comb is knocked.

The advantages of a currycomb provided with means for ventilating its interior and collecting and discharging the dust will be appreciated by those skilled in the art, and my invention will be found to possess features of merit and advantage over the usual constructions of open combs, whereby the dust is merely dislodged and dispersed at random.

Having described my invention, what I claim is—

1. A currycomb consisting of a main body portion comprising an upper compartment, having a top, a lower transverse partition provided with ventilating-perforations, and connecting side and end walls similarly provided with ventilating-perforations whereby a current of air is induced through the compartment, and combing-blades secured to the partition, substantially as set forth.

2. A currycomb provided with a horizontal partition, scrapers projecting downwardly therefrom, dust-collecting shelves, and vertical separating-partitions provided with air-circulating perforations, and a ventilating-coping whereby a circulation of external air is induced, substantially as set forth.

3. A currycomb provided with horizontal and vertical partitions, downwardly-projecting scrapers, an air-ventilating coping, and a discharging-door, substantially as set forth.

4. A currycomb consisting of an inclosed box having a horizontal partition, scrapers projecting downwardly therefrom, vertical partitions above the horizontal partition, provided with air-circulation openings, dust-collecting shelves, an air-circulation coping, and a discharging-door, substantially as set forth.

5. A currycomb consisting of an inclosed box having a horizontal partition, scrapers projecting downwardly therefrom, vertical partitions above the horizontal partition, provided with air-circulation openings, dust-collecting shelves, an air-circulation coping, an operating-handle, and a spring-controlled discharging-door with a finger-operated opening mechanism, substantially as set forth.

6. A currycomb consisting of an inclosed box having air-circulation openings through the top, a series of scraping-blades secured to the top and projecting downwardly therefrom, provided with openings, and a series of transverse dust-collecting shelves having ventilating-openings therethrough, substantially as set forth.

7. A currycomb consisting of an inclosed box having air-circulation openings through the top, a series of scraping-blades secured to the top and projecting downwardly therefrom provided with openings, and a series of transverse upwardly and inwardly sloping dust-collecting shelves having ventilating-openings through their middle portion, substantially as set forth.

In testimony whereof I have hereunto set my hand.

ROBERT T. GILLESPIE.

Witnesses:
JOHN W. MURPHY,
NATHANIEL E. MURPHY.